Patented Feb. 16, 1954

2,669,562

UNITED STATES PATENT OFFICE 2,669,562

DIHYDROSTREPTOMYCIN TRI-(p-AMINO-SALICYLATE) AND PROCESS OF PREPARING THE SAME

Armin G. Wilson, Newark, and Max Tishler, Westfield, N. J., assignors to Merck & Co., Inc., Rahway, N. J., a corporation of New Jersey No Drawing. Application December 10, 1948, Serial No. 64,708

2 Claims. (Cl. 260—210).

This invention relates generally to novel therapeutic preparations and, more particularly, to a new salt of dihydrostreptomycin, namely dihydrostreptomycin tri-(p-aminosalicylate).

Both dihydrostreptomycin and p-aminosalicylic acid are known to be of value in the treatment of tuberculosis. Moreover, p-aminosalicylic acid is known to reduce the fastness of the microorganisms to streptomycin which results after prolonged administration of the latter drug. It was therefore an object of this invention to prepare a product suitable for combined therapy which would permit simultaneous parenteral administration of p-aminosalicylic acid and dihydrostreptomycin.

Since p-aminosalicylic acid is very insoluble in water, an aqueous solution of sodium p-aminosalicylate is ordinarily employed for injection therapy. Unfortunately it is difficult to prepare white sodium p-amino-salicylate. Moreover, water solutions of sodium p-aminosalicylate are extremely unstable and readily oxidize to form colored solutions unsatisfactory for therapeutic use. A further object of this invention therefore, was to prepare a white salt of p-aminosalicylic acid (suitable for injection) which forms colorless stable aqueous solutions.

The employment, for injection purposes, of a solution containing sodium p-aminosalicylate and a salt of dihydrostreptomycin suffers from the additional disadvantage that since relatively large amounts of these drugs are ordinarily administered, a significant quantity of inorganic salts would necessarily be present in the parenteral solutions. Parenteral solutions of dihydrostreptomycin, such as those ordinarily utilized are highly concentrated, containing as much as 1 gm. in 2 cc. It was therefore a still further object of this invention to prepare a product capable of forming concentrated aqueous solutions suitable for parenteral administration and providing both dihydrostreptomycin and p-aminosalicylic acid substantially free of inorganic salts.

We have discovered that the foregoing objects can be achieved by producing the novel salt dihydrostreptomycin tri-(p-aminosalicylate). This salt is, surprisingly enough, extremely soluble in water, and can be used to prepare aqueous solutions having a concentration as high as 50%. Dihydrostreptomycin tri-(p-aminosalicylate) is white in color, and forms colorless stable aqueous solution completely free of inorganic components. The aqueous solutions thus prepared are suitable for parenteral administration and make possible the simultaneous injection of p-aminosalicylic acid and dihydrostreptomycin.

We have also discovered that this novel salt can be prepared by metathetically reacting 3 molecular equivalents of a salt of p-aminosalicylic acid with 1 molecular equivalent of a salt of dihydrostreptomycin, whereby the desired dihydrostreptomycin tri-(p-aminosalicylate) is produced. The reaction is ordinarily carried out in an aqueous solution. As previously noted, however, dihydrostreptomycin tri-(p-aminosalicylate) is extremely soluble in water. It has therefore been found best to employ in this reaction a salt of p-aminosalicylic acid containing a cation which reacts with the anion of the dihydrostreptomycin salt to form a water-insoluble salt. For example, the barium salt of p-aminosalicylic acid can be reacted with dihydrostreptomycin sulfate thereby precipitating barium sulfate which can be removed by centrifugation or filtration to produce an aqueous solution containing dihydrostreptomycin tri-(p-aminosalicylate) substantially uncontaminated with inorganic salts.

Alternatively, the p-aminosalicylic salt of an anion exchange resin such as Ionac-A300 (a resin manufactured by American Cyanamid) or Amberlite IR-4B (the reaction product of phenol-formaldehyde and a polyamine, manufactured by the Resinous Products and Chemicals Corp.) is reacted with a solution of a dihydrostreptomycin salt, such as dihydrostreptomycin tri-hydrochloride. The chloride ion replaces the p-aminosalicylic acid adsorbed on the resin, and the effluent aqueous solution contains the dihydrostreptomycin tri-(p-aminosalicylate) substantially uncontaminated with inorganic salts.

The aqueous solution containing the new salt of dihydrostreptomycin is then evaporated from the frozen state thereby producing dihydrostreptomycin tri-(p-aminosalicylate) in substantially pure form.

The following examples illustrate methods of carrying out the present invention, but it is to be understood that these examples are given for purposes of illustration and not of limitation.

EXAMPLE 1

11.05 g. of p-aminosalicylic acid and 11.38 g. of barium hydroxide were completely dissolved in 60 ml. of water at 50° C. by swirling gently for a few moments.

The solution was cooled to 35° C., and 17.86 g. of dihydrostreptomycin sulfate were added. The mixture was then swirled again for a few moments to insure the complete precipitation of barium sulfate.

The mixture was then centrifuged, and the supernatant liquid was decanted through a mat of filter cel (Supercel) into a freeze-drying flask. The barium sulfate sludge was washed twice by suspending in 20 ml. of water, centrifuging, and decanting and filtering the supernatant liquid each time. The combined filtrates were freeze dried, and a pale cream, non-hygroscopic mass was obtained, yield 25.0 g. (100%).

The solid was identified as dihydrostreptomycin tri-(p-aminosalicylate) by examination of the ultraviolet adsorption spectrum for the anion of p-aminosalicylic acid, which indicated an anion content of 39.8% (theory 44.0%). The dihydrostreptomycin content was determined by biological assay, comparing the results with those of a sample of pure dihydrostreptomycin trihydrochloride. The tri-(p-aminosalicylate) showed an activity of 540 units of free base per mg. of material. The trihydrochloride activity was 830 units per mg. The dihydrostreptomycin content of the dihydrostreptomycin tri-(p-aminosalicylate) was thus shown to be about 55% (theory 56%).

Analysis.—Calculated for $C_{42}H_{62}O_{21}N_{10}$; N, 13.44. Found: N, 12.84.

EXAMPLE 2

A column of Ionac-A300 ion exchange resin (American Cyanamid) of 25 g. dry weight was converted from the hydroxide cycle to the p-aminosalicylate cycle by passing through the column a solution of 40 g. of p-aminosalicylic acid in 1200 ml. of aqueous 70% ethanol. The column was then washed thoroughly with distilled water. A second column was then prepared in the same manner as the first.

A solution of 15 g. of dihydrostreptomycin trihydrochloride in 15 ml. of distilled water was passed through the first column at a rate of 1 ml. per minute. The effluent was collected in 2-ml. cuts. Those cuts containing more than 0.1% chloride ion were passed through the second column. The effluent cuts containing less than 0.1% chloride ion were combined and freeze-dried, yield: 19.7 g. (87%). The solid was identified as dihydrostreptomycin tri-(p-aminosalicylate) in the same manner as in Example 1.

Modifications may be made in carrying out the present invention without departing from the spirit and scope thereof. Insofar as these modifications are within the purview of the annexed claims, they are to be considered as part of our invention.

We claim:
1. Dihydrostreptomycin tri-(p-aminosalicylate).
2. The process which comprises reacting barium (p-aminosalicylate) with dihydrostreptomycin sulfate, removing the precipitated barium sulfate thus formed, and recovering the dihydrostreptomycin tri-(p-aminosalicylate) from the resulting aqueous solution.

ARMIN G. WILSON.
MAX TISHLER.

References Cited in the file of this patent

Ratcliff Reader's Digest, November 1945, page 39.

Peck et al., JACS, vol. 68 (1946), pages 1390–1391.

Kuehl et al., JACS, vol. 68 (1946), pages 1460–1462.

Youmans et al., J. Bact., vol. 54 (1947), pages 415–416.